(12) United States Patent
Swanson et al.

(10) Patent No.: US 7,945,841 B2
(45) Date of Patent: May 17, 2011

(54) SYSTEM AND METHOD FOR CONTINUOUS LOGGING OF CORRECTABLE ERRORS WITHOUT REBOOTING

(75) Inventors: Robert C. Swanson, Olympia, WA (US); Michael A. Rothman, Puyallup, WA (US); Mallik Bulusu, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1196 days.

(21) Appl. No.: 11/634,500

(22) Filed: Dec. 6, 2006

(65) Prior Publication Data
US 2008/0141077 A1    Jun. 12, 2008

(51) Int. Cl.
*G11C 29/00* (2006.01)

(52) U.S. Cl. .......................... 714/764; 714/779; 714/53

(58) Field of Classification Search .................. 714/764, 714/48, 15, 21, 124, 158, 779, 53
See application file for complete search history.

(56) References Cited

U.S. PATENT DOCUMENTS

| 5,644,709 | A * | 7/1997 | Austin | 714/53 |
| 6,948,094 | B2 * | 9/2005 | Schultz et al. | 714/15 |
| 7,120,765 | B2 * | 10/2006 | Dodd et al. | 711/158 |

* cited by examiner

*Primary Examiner* — Fritz Alphonse
(74) *Attorney, Agent, or Firm* — Joni D. Stutman

(57) ABSTRACT

In some embodiments, the invention involves a system and method to continuously log correctable errors without rebooting by changing the granularity of the error detection and logging mechanism. A mask register is used to identify which errors are to be logged. Each bit of the mask register may represent a different memory component of the system. Logging of the memory component is determined by the value of the bit in the mask. The masking enables granularity of error logging to the channel and/or dual in-line memory module (DIMM) level. Other embodiments are described and claimed.

18 Claims, 3 Drawing Sheets

SYSTEM AND METHOD FOR CONTINUOUS LOGGING OF CORRECTABLE ERRORS WITHOUT REBOOTING

FIELD OF THE INVENTION

An embodiment of the present invention relates generally to computing systems and, more specifically, to a system and method to continuously log correctable errors without rebooting by changing the granularity of the error detection and logging mechanism.

BACKGROUND INFORMATION

On server products, for example, available from Intel Corp., the platform basic input output system (BIOS) sets up a threshold for correctable errors. Once that threshold is crossed in a given time period the BIOS creates a system event log indicating that the system will no longer log correctable errors and masks the chipset's ability to generate a system management interrupt (SMI) upon receiving a correctable error. This is done to avoid performance degradation and redundant logging of the same memory error, for instance. If the user wants to re-enable logging, the system must be reset and perform power on self test (POST) again. There is not sufficient granularity on these correctable errors, which results in a loss of logging and RAS (Reliability, Availability, and Serviceability) support.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to masking and logging of correctable errors in a computing device. In at least one embodiment, the present invention is intended to enable continuous logging of correctable errors without requiring a reboot to re-enable logging.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Embodiments of the present invention change the outdated masking mechanism of existing systems to include a channel/DIMM level granularity. In some embodiments, a "leaky bucket," to be discussed below, is used to count down time since logging was disabled and then re-enable logging based upon the RAS system state and then self diagnose the aspects of the disabled logging. All of this may be done without necessitating a reset, according to embodiments of the invention. Servers may continue to log correctable events across the system which will result in increased up time of the server.

A variety of error sources may exist on a platform, i.e., PCI subsystem, memory subsystem, etc. Embodiments of the invention are described using correctable errors associated with memory, for illustrative purposes; however, other correctable errors may be logged in a similar manner and the present invention is not limited to only memory errors. If, for example, more than 10 correctable errors occur within a 24-hour period, all correctable error logging for the memory will be masked, even if those errors are spread across all of the DIMMs or localized to a single DIMM. Embodiments of the invention provide a mask register for each channel/slot in the memory.

Figure 1:
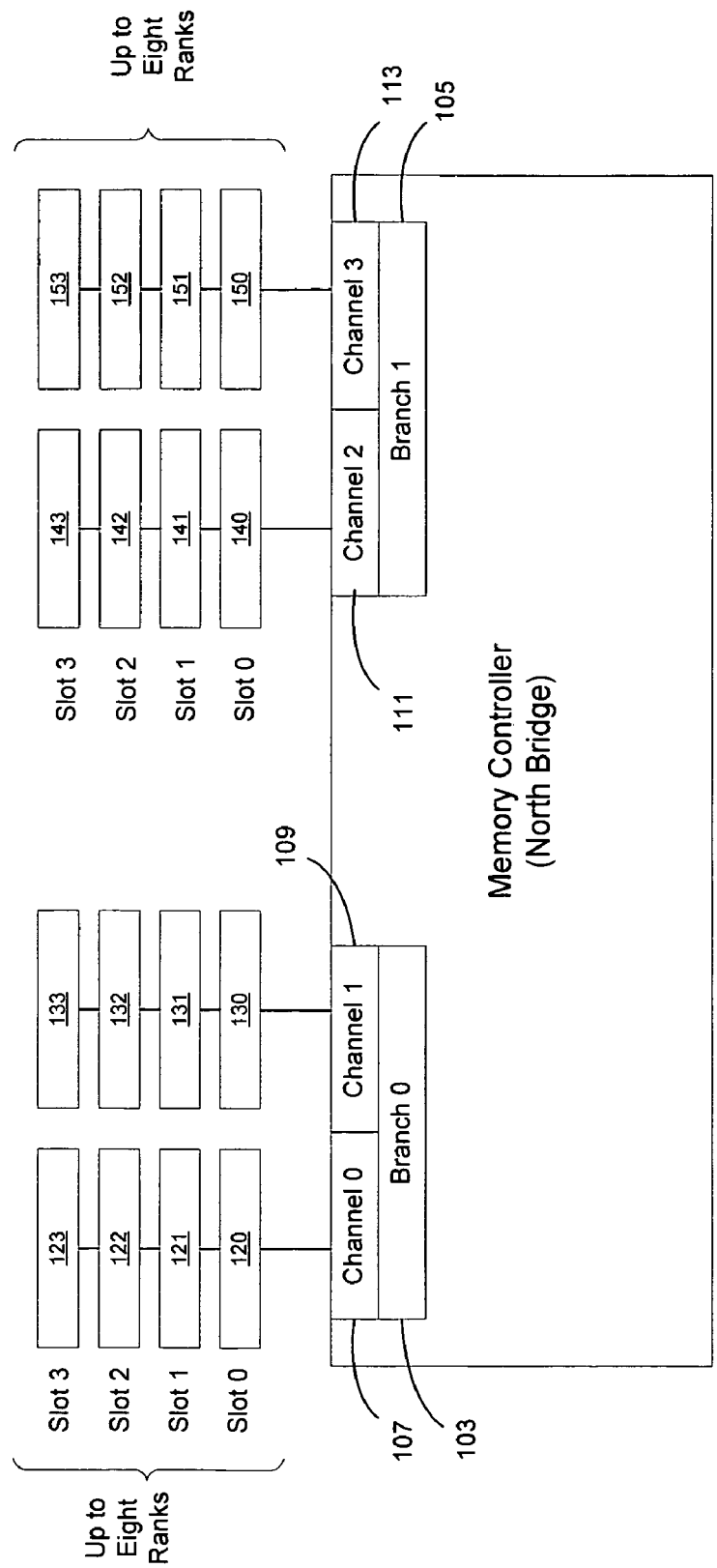
FIG. 1 is a block diagram showing a memory system to be used, according to an embodiment of the invention.

Referring to FIG. 1, a memory controller 101 may have several branches and channels of DIMMs. In an exemplary embodiment, the memory controller 101 has two branches of DIMMS, branch 0 (103) and branch 1 (105). Each branch (103, 105) has two channels (107, 109 and 111, 113), respectively. Each channel has four DIMM slots, so that each branch has up to eight ranks. In the exemplary embodiment, channel 0 (107) has slots 0-3 (120, 121, 122, 123); channel 1 has slots 0-3 (130, 131, 132, 133); channel 2 has slots 0-3 (140, 141, 142, 143); and channel 3 has slots 0-3 (150, 151, 152, 153).

When a correctable error occurs in the memory system, it is logged onto the event log. However, the event log is finite. In existing systems, the event log may only be able to contain 1600 entries. If a correctable error is asserted repeatedly, the event log could fill up within a matter of seconds. Because of this, existing systems limit the number of correctable errors that are logged. When the same correctable error has been asserted a predetermined number of times in a specific time period, that error is masked out. The repeating correctable error is then no longer logged, and no longer taking up additional space in the event log. This has been desirable to prevent the event log from filling up too quickly, and also because each correctable error to be logged generates a system management interrupt (SMI), having associated overhead which affects system performance.

However, methods to log errors, in existing systems, are not very granular. Thus, it may be difficult to pinpoint the actual location of the error. In some existing systems, the level of granularity is so weak as to only indicate that the error occurred somewhere in the memory subsystem. In some memory subsystems, identification of the faulty DIMM may be at the channel level, DIMM level or subsystem level. Even if the granularity identifies the individual DIMM, one bad DIMM may cause error masking for the entire subsystem. Subsequent DIMM errors will not be logged, regardless of in which DIMM they occur. In a server that has uptime requirements, it is desirable to perform all hardware maintenance at the same time to limit downtime. If the second DIMM errors were never logged, then preventative maintenance will be scheduled only to replace the first bad DIMM. Once the server is again brought on line, the second DIMM will exhibit correctable errors and log the events. However, another maintenance cycle may not be scheduled for months, thereby missing an opportunity to swap out additional faulty parts.

Each error in the memory subsystem is associated with an M-ERROR (for instance, M0-M29). The north bridge (memory controller) can see and assert these M-ERRORS. Certain error signals are associated with certain input pins on the subsystem (i.e., GPIOs). Each general purpose input/output (GPIO) pin is capable of generating an SMI. Generally, the pin is held at zero. When an error occurs, the pin is held high (1). However, various platform may implement the pins to be held high (1) until an error occurs, and then clear the pin. The SMI notifies the BIOS that an error has occurred.

On a traditional memory controller there may be 30 errors, M0-M29. Each platform may assert a different number of errors. Generally, there may be three error pins: ERR0, ERR1, and ERR2. These error signals are set up in the memory controller. Each M-ERROR is routed via a mask and enable register to different error pins. In some embodiments, M0-M9 will be on ERR0 pin, M10-M19 will be on ERR1 pin and M20-M29 will be on ERR2 pin. The error pins are routed to the GPIO pins. The GPIO pin is asserted on error. If an M0 error occurs, the memory controller 101 determines whether the error is masked. If not, the M-ERROR will drive the ERR0 pin which drives the associated GPIO. Once the GPIO is asserted, and an SMI is generated, the BIOS investigates the asserted error to take appropriate action. If the error has been masked out, then the memory controller does not assert the error pin, and the BIOS may be unaware that a correctable error has occurred.

An M-ERROR is classified by error type. For instance one platform may have a memory controller with 28 M-ERRORs, M1-ERROR to M28-ERROR. The errors are classified by the type of event that occurred. For example, an M20-ERROR on one platform may be a correctable patrol data ECC error. Once the GPIO is asserted and generates an SMI, the BIOS may then investigate and determine the category of error and where it occurred, to a predetermined granularity. If the chipset does not have the capability to pinpoint the error location, the BIOS may access the memory controller and view registers to determine where the error occurred. Masking of errors occurs at the ERR-n and M-ERROR level to force or avoid asserting a GPIO event that will trigger an SMI.

Suppose there are many M17-ERRORs occurring in a given time period, the BIOS may mask the errors. If 10 of these errors are received, for instance, in a 24-hour period, the M17-ERROR may be masked so that no M17-ERRORs will be logged again. This masking will avoid asserting the SMI, and thereby avoid the overhead associated with handling the SMI. A reboot is typically required to reassert handling of this type of error. In existing systems, there is no way to re-enable the handling of these errors without rebooting.

Each memory subsystem typically has a branch, channel and slot identifier for the individual DIMMs, as shown in FIG. 1. Embodiments of the invention provide an additional register to maintain information regarding the location of an error. In one embodiment, the register may be located within the memory controller, or tightly coupled with memory controller logic. In another embodiment, the register may be located on the motherboard, which may not necessarily be tied to the memory controller. Implementation of the register depends on the memory technology used, i.e., fully buffered DIMMs (FBD) may require a memory controller location, and double data rate (DDR) memory may use the motherboard location. The register is a bitmap of the DIMMs. Suppose DIMM-4 is bad and is generating many correctable errors. The error is asserted through the M-ERROR and pins, as before, but the location of the DIMM is noted in the masking register. In some embodiments, a 0 indicates that the error should be asserted and a 1 indicates that the error should be masked. Other embodiments may reverse this convention. Thus, if the correctable errors from DIMM-4 are masked, an SMI will still be generated for errors of the same type cause by another DIMM. In essence, the mask register adds another level of information to increase the granularity of the error masking.

For a DDR, ECC hardware may be set up on a motherboard to determine whether the DIMM has had an ECC correctable error. The BIOS determines whether the error should be masked, and for what locations. The BIOS modifies the mask register as appropriate so that masked errors will not generate further SMIs requiring the BIOS to handle the specific error. When errors have not been masked, the BIOS may log the errors and/or perform other actions, as appropriate.

FBD implementation will typically require a hardware change in the memory controller to include the mask register. For DDR implementations, the register may be located anywhere on the motherboard, as long as the BIOS is programmed to know how to access the mask register.

For purposes of this disclosure, the term "leaky bucket" is described below. For instance, if an error is set to mask out after n occurrences in 24-hours. A leaky bucket helps determine what to do at the $25^{th}$ hour. If there are n−1 errors in a 24-hour period, during the $25^{th}$ hour, any errors occurring at the $1^{st}$ hour are dropped. Thus, the 24-hour time period is a constantly moving window. If one analogizes the bucket to be the repository for errors, then the bucket leaks older errors to maintain the threshold window of errors. The leaky bucket has a specific decay rate associated with it. The leaky bucket is typically contained in the chipset. Embodiments of the invention extend the concept of a leaky bucket to individual DIMMs. A leaky bucket may be implemented in software rather than hardware. With the mask register, the BIOS may reset the masking via the register, to re-enable error logging, rather than requiring a reboot for a hardware mask. A "leaky counter" is the decay rate at which items fall out of the leaky bucket.

Figure 2:
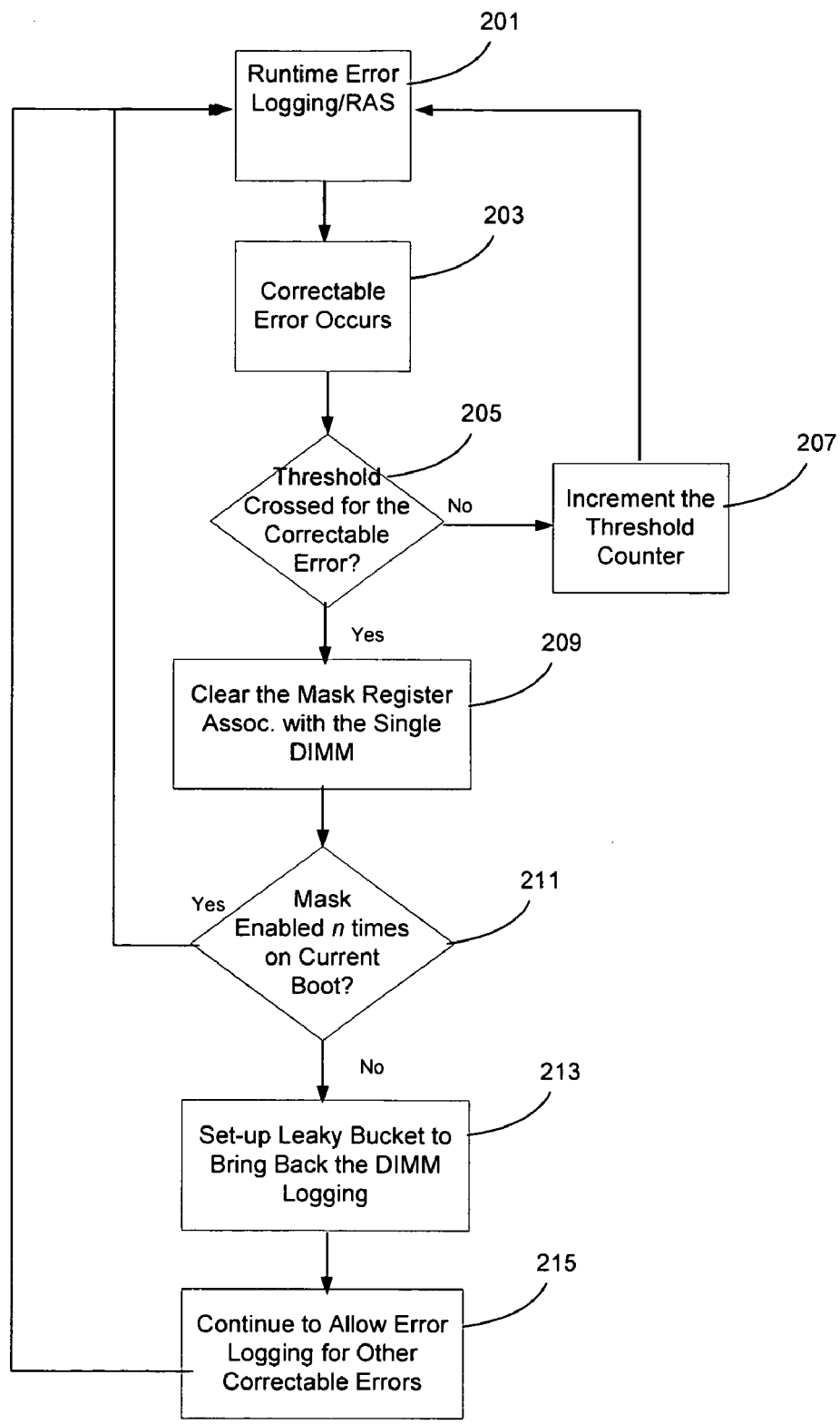
FIG. 2 is a flow diagram illustrating a method for masking correctable errors according to an embodiment of the invention.

Referring now to FIG. 2, there is shown an exemplary method for enabling continuous logging according to embodiments of the invention. The system is up and running in block 201. When a correctable error occurs in block 203, a determination is made as to whether the threshold has been crossed for logging of this error for the specific DIMM, in block 205. If the threshold has not been reached, then the error is logged and the counter for the DIMM is incremented in block 207.

If the leaky counter threshold has been reached, then error logging for this DIMM is masked in the mask register, in block 209. If the error is masked, it is then determined whether the masking has been enabled n number of times during the current boot, in block 211. If not, then a leaky bucket is set up and DIMM error logging is brought back on line in block 213. Error logging is then continued in block 215.

If the threshold n has been reached, as determined in block 211, then it is not enabled and processing continues until the next error event occurs, in block 201. This threshold prevents a bad DIMM from continually generating SMI events which create undue overhead in the system. It also allows transient errors to be logged when they occur.

Figure 3:
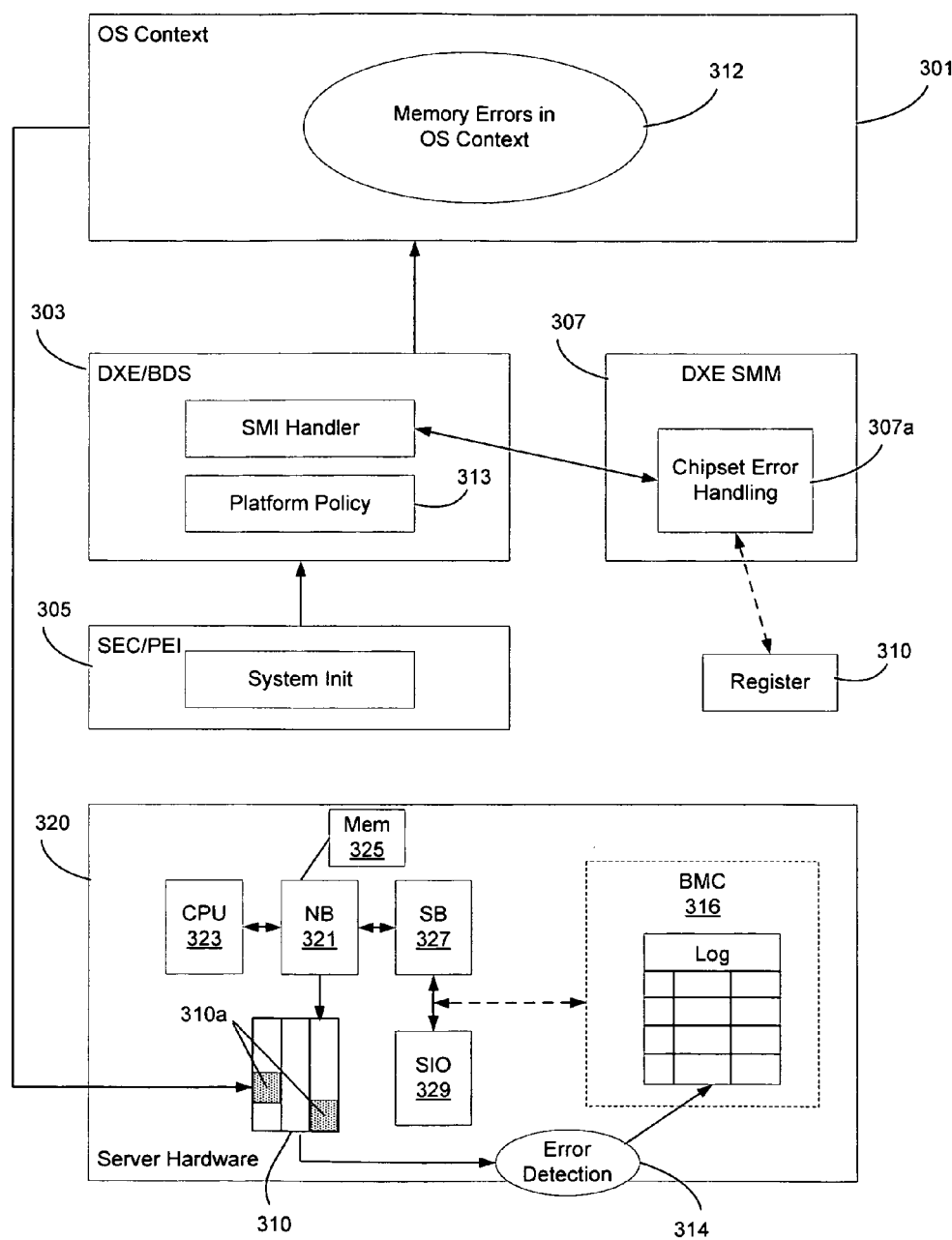
FIG. 3 is a block diagram, illustrating a policy management flow for masking and logging correctable errors, according to an embodiment of the invention.

Referring now to FIG. 3, there is shown a block diagram representing both hardware 320 and software 301, 303, 305 and 307 representations of a system in which embodiments of the invention may be implemented.

SEC/PEI 305 represents early BIOS initialization, for instance on an extensible firmware interface (EFI) architecture, where PEI is pre-EFI initialization, and SEC pertains to Security initialization tasks. This stage initializes the system. The DXE/BDS (driver execution environment/boot device selector) stage 303 sets up the error handler. The DXE SMM (system management mode) 307 is the runtime error handler. This runtime handler modifies the mask register 310 to enable and disable error logging for a specific item.

An M-ERROR will occur in the OS context 312 and assert the appropriate pins and GPIO in the server hardware 320. The memory controller (north bridge) 321 logic combines with the mask register 310 to produce error detection 314. Error detection block 314 is another representation of the chipset error handler 307a being executed. In some embodiments, an "OR" operation may be used on the register 310 and the north bridge 321 to determine whether the error should be logged, and if so, drive the appropriate GPIO pins (not shown). In this representation, bits 310a are masked so that no error logging will occur for these items.

The system may have a baseboard management controller (BMC) 316. The BMC may assert an SMI to drive and communicate with the BIOS and force masking and unmasking of the error handling. This allows out-of-band (OOB) control of the error logging process.

Embodiments of the invention will comprise a processor 323 coupled to a memory controller (north bridge) 321. The north bridge 321 is coupled to memory 325 and an I/O controller (south bridge) 327 which may be coupled to a super I/O (SIO) 329. The GPIOs that drive an SMI in response to an error may reside in the south bridge 327 or in the SIO 329. The north bridge communicates the error to the south bridge in order to assert the GPIO to assert SMI to handle the errors. This policy is set up in DXE 303 as a platform policy 313. The BMC 316 may communicate with the system firmware (BIOS) via the south bridge 327. In other embodiments, Intel® Active Management Technology (iAMT) may be used to communicate out-of-band to control logging.

Referring again to FIG. 1, if a single DIMM, say Branch 0 (103), Channel 0 (107), Slot 0 (120) has a persistent correctable error, only that memory location will be masked from asserting a SMI. If there are no other memory errors, all of the other DIMMs in the system will still be able to report correctable errors. If DIMM 120 was merely overheated instead of defective, the system may have resolved the issues with thermal throttling. After another set period of time DIMM 120 should be allowed to participate in creation of system event logs. In one embodiment, after the leaky bucket expires, the firmware will re-enable the mask register of the DIMM 120, providing a three strikes policy (if n=3). If the DIMM has been enabled for three consecutive times and each time it fails, the system will no longer bring the logging of that DIMM online. However, the rest of the error logging subsystem will remain intact.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
a platform comprising a processor and at least one platform component, the at least one platform component being capable of driving correctable errors, the errors capable of being logged; and
a mask register corresponding to the at least one platform component, the mask register to identify a first element of the at least one platform component where error logging is to be disabled, while continuing to enable error logging in a second element of the at least one platform component,
wherein the at least one platform component comprises memory, and
wherein the mask register comprises a bitmap of elements of the memory.

2. The system as recited in claim 1, wherein the mask register resides on one of a platform motherboard or a controller of the at least one platform component.

3. The system as recited in claim 2, wherein the controller comprises a memory controller.

4. The system as recited in claim 3, wherein the memory comprises fully buffered dual in-line memory modules (DIMMs FBD) and the mask register resides in the memory controller, and wherein the mask register comprises a bitmap of the DIMMs.

5. The system as recited in claim 3, wherein the memory comprises double data rate (DDR) memory and the mask register is coupled to the platform motherboard, and wherein the mask register comprises a bitmap of the DDR memory.

6. The system as recited in claim 1, wherein the mask register is updated by platform firmware basic input output system (BIOS) runtime handler.

7. The system as recited in claim 6, wherein an out-of-band controller drives the BIOS to update the mask register to identify elements that are to be disabled from error logging.

8. The system as recited in claim 1, wherein the error logging of the first element depends on a first threshold to determine a frequency of an error in a predetermined time frame, and a second threshold to determine a count of re-enable of the error logging for the first element.

9. A computer implemented method comprising,
initiating runtime logging of correctable errors of a platform component on a computing platform; and
in response to a correctable error event in the computing platform, the error associated with an element of the platform component,
determining whether a threshold for the correctable error event has been reached, and if not, then logging the error, but if so, then disabling error logging for the element by setting a bit in a mask register coupled to the computing platform to indicate that error logging is disabled for the element, the bit being associated with the element, while allowing error logging to continue for other elements of the platform component, and
checking a leaky bucket counter to determine whether the correctable error should be enabled or disabled.

10. The method as recited in claim 9, wherein the mask register resides on one of a platform motherboard or a controller of the at least one platform component.

11. The method as recited in claim 10, wherein the platform component comprises memory, and the controller comprises a memory controller, and wherein the memory comprises fully buffered dual in-line memory modules (DIMMs FBD) and the mask register resides in the memory controller, and wherein the mask register comprises a bitmap of the DIMMs.

12. The method as recited in claim 10, wherein the platform component comprises double data rate (DDR) memory and the mask register is coupled to the platform motherboard, and wherein the mask register comprises a bitmap of the DDR memory.

13. The method as recited in claim 9, further comprising:
communicating with an out-of-band controller to control the enabling/disabling of correctable errors.

14. A machine readable storage medium having instructions stored therein, that when executed, cause a machine to:
initiate runtime logging of correctable errors on a platform; and
in response to a correctable error event in the platform, the error associated with an element of a platform component,
determine whether a threshold for the correctable error event has been reached, and if not, then log the error, but if so, then disable error logging for the element by setting a bit in a mask register to indicate that error logging is disabled for the element, the bit being associated with the element, while allowing error logging to continue for other elements of the platform component, and
check a leaky bucket counter to determine whether the correctable error should be enabled or disabled.

15. The medium as recited in claim 14, wherein the mask register resides on one of a platform motherboard or a controller of the at least one platform component.

16. The medium as recited in claim 15, wherein the platform component comprises memory, and the controller comprises a memory controller, and wherein the memory comprises fully buffered dual in-line memory modules (DIMMs FBD) and the mask register resides in the memory controller, and wherein the mask register comprises a bitmap of the DIMMs.

17. The medium as recited in claim 15, wherein the platform component comprise double data rate (DDR) memory and the mask register is coupled to the platform motherboard, and wherein the mask register comprises a bitmap of the DDR memory.

18. The medium as recited in claim 14, further comprising instructions to:
communicate with an out-of-band controller to control the enabling/disabling of correctable errors.

* * * * *